March 4, 1969  J. L. ADAMS  3,430,441

ENGINE FOR CONVERTING ENERGY BY THERMAL EXPANSION OF SOLIDS

Filed Sept. 19, 1967  Sheet 1 of 2

John L. Adams
INVENTOR.

BY Clarence A. O'Brien
and Harvey B. Jacobson
Attorneys

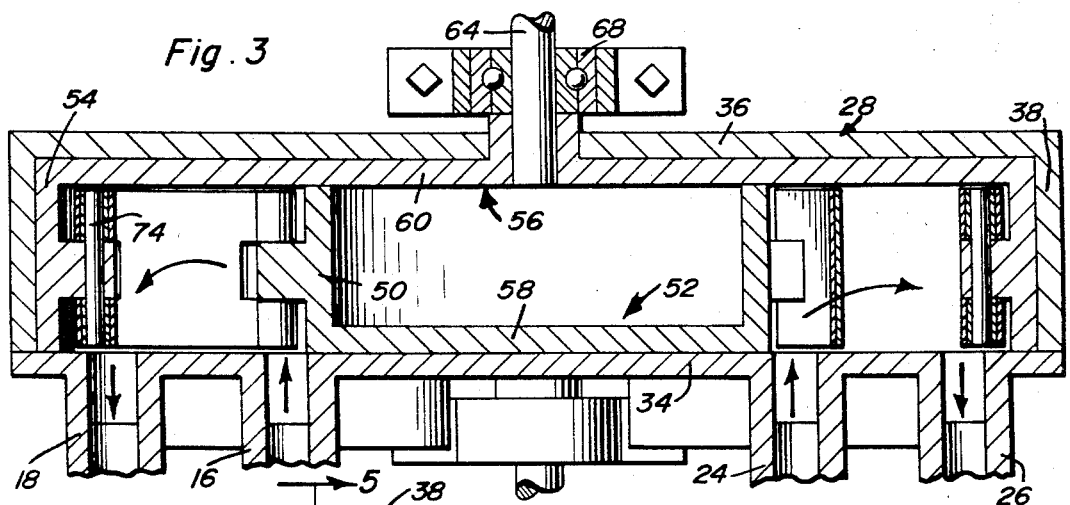
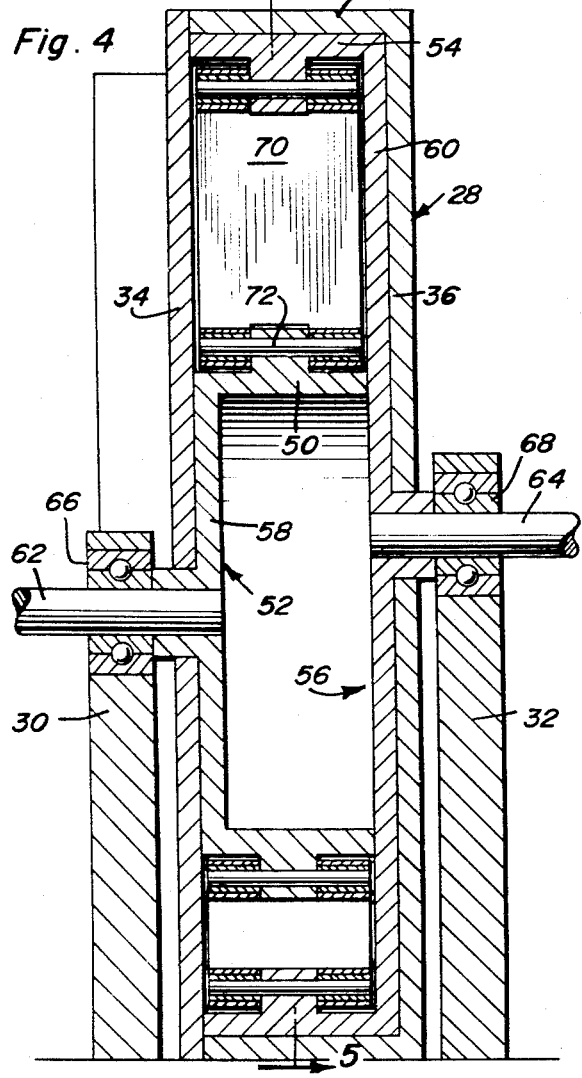
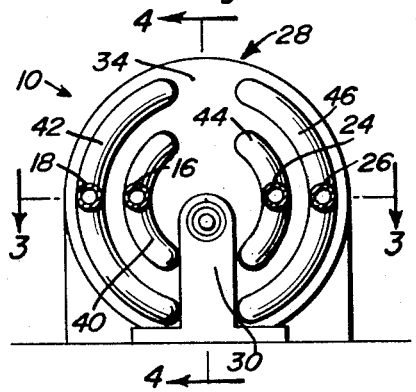

United States Patent Office 3,430,441
Patented Mar. 4, 1969

3,430,441
ENGINE FOR CONVERTING ENERGY BY THERMAL EXPANSION OF SOLIDS
John L. Adams, 4563 Via Santa Maria,
Santa Maria, Calif. 93454
Filed Sept. 19, 1967, Ser. No. 668,780
U.S. Cl. 60—23        6 Claims
Int. Cl. F03g 7/06

ABSTRACT OF THE DISCLOSURE

An engine which converts heat energy into continuous rotational mechanical energy by expansion and contraction of bimetallic elements. The bimetallic elements are pivotally interconnected between eccentrically mounted rotors so that progressive bending and straightening of the elements produces relative rotation of the rotors. Heating and cooling zones are established in a chamber formed radially between the rotors through which the elements pass so that cyclic expansion and contraction occurs as the rotors rotate.

---

This invention relates to the conversion of heat energy into mechanical energy by thermal expansion and contraction of solid matter.

The direct conversion of heat energy into mechanical energy is well-known but not utilized as a source of mechanical energy. Instead, this conversion of heat energy to mechanical energy is generally confined to heat sensing instruments. Thus, the thermal expansion properties of solids have been utilized for control and heat measuring functions.

Some proposals have been made to convert the small movement produced by thermal expansion and contraction of solid members such as bimetallic elements into a rotational output. These proposals however, have been limited to converting the reciprocatory movement produced by such bimetallic elements when expanding and then contracting, into rotational movement through intermittent drive arrangements which produce a step-by-step rotational output. Accordingly, any mechanical output so produced would be rather limited and unsatisfactory for substantial generation of mechanical power.

The present invention involves a new approach to the generation of mechanical energy by expansion and contraction of solid members such as bimetallic elements. In accordance with the present invention, a continuous rotational output drive torque is produced by a novel arrangement of a relatively large number of bimetallic elements, each contributing to the energy conversion process in order to produce a substantial mechanical output. The thermally expansible elements are pivotally interconnected between the radially outer portions of two rotors rotatably mounted in eccentric relation to each other within a thermally nonconductive housing. Heating and cooling zones are established within the housing between the rotors, through which the thermally expansible elements pass so that the resultant cyclic expansion and contraction of each of the elements maintains relative rotation between the rotors producing a continuous rotational output.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a front elevational view of the engine associated with the system depicted in FIGURE 1.

FIGURE 3 is a transverse sectional view taken substantially through a plane indicated by section line 3—3 of FIGURE 2.

FIGURE 4 is a sectional view taken substantially through a plane indicated by section line 4—4 in FIGURE 2.

Figure 1:
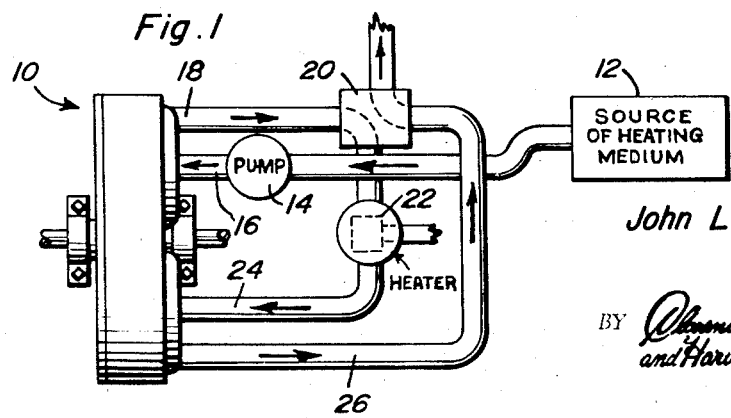
FIGURE 1 is a simplified diagrammatic view showing a power generating system utilizing the engine of the present invention.

Referring now to the drawings in detail, it will be observed from FIGURE 1 that the engine of the present invention generally denoted by reference numeral 10 is associated with a power generating system by means of which heat energy is continuously supplied to and removed from the engine. While many arrangements may be devised for this purpose, in the embodiment illustrated by way of example only, a fluid heating medium derived from a source 12 is supplied by the pump 14 to the engine through a supply conduit 16. The fluid supplied through the conduit 16 will be in a relatively cool state and passes through the engine 10 for heat exchange purposes. Thus, the fluid heating medium will emerge from the engine at a higher temperature and be conducted by the conduit 18 to a preheater 20. The fluid medium is further heated in the preheater and then supplied to the main heater 22 within which it is elevated to a relatively high temperature. Thus, the heated fluid medium is supplied by the conduit 24 to the engine for extracting heat energy therefrom before it leaves the engine through an exhaust conduit 26. Since the fluid medium will still be at a relatively high temperature when leaving the engine, it is passed through the preheater 20 in heat exchange relation to the fluid within the conduit 18 for preheating purposes. Thus, the fluid heating circuit depicted in FIGURE 1 represents merely one possible method for establishing cooling and heating zones within the engine as will be further explained hereafter.

As shown in FIGURES 2 through 5, the engine 10 may be enclosed by a thermally non-conductive housing 28 supported between the axially spaced supports 30 and 32. The housing includes parallel spaced end walls 34 and 36 interconnected by a radially outer cylindrical wall 38. Connected to the end wall 34 on one side of the support 30 in one embodiment of the invention is a radially inner arcuate manifold 40 to which the supply conduit 16 is connected and a radially outer arcuate manifold 42 to which the outlet conduit 18 is connected. Thus, fluid at a lower temperature is circulated through the housing in order to establish a cooling zone therein which is spaced from a heating zone established by means of the radially inner and outer arcuate manifolds 44 and 46 respectively connected to the heat supply conduit 24 and the exhaust conduit 26.

The cooling and heating zones are established within an annular chamber 48 communicating with the arcuate manifolds 40, 42, 44 and 46 aforementioned. The annular chamber 48 is formed between a radially outer flange portion 50 of a rotor 52 and the radially outer flange portion 54 of rotor 56. The radially outer portions 50 and 54 of the rotors extend from the rotor disks 58 and 60 respectively connected to the shafts 62 and 64. The shafts are rotatably mounted by the bearing assemblies 66 and 68 in the supports 30 and 32 to rotatably journal the shafts in parallel spaced relation to each other for rotatable mounting of the rotors within the housing in eccentric relation to each other. The shafts are therefore connected to the hubs of the rotors which extend through openings in the side walls of the housing. It will of course be appreciated that proper sealing and lubricating facilities will be provided in order to accommodate relative rotation of the rotors 52 and 56 while the heating fluid medium is conducted through the annular chamber 48 with a minimum amount of heat loss and frictional losses.

Figure 5:
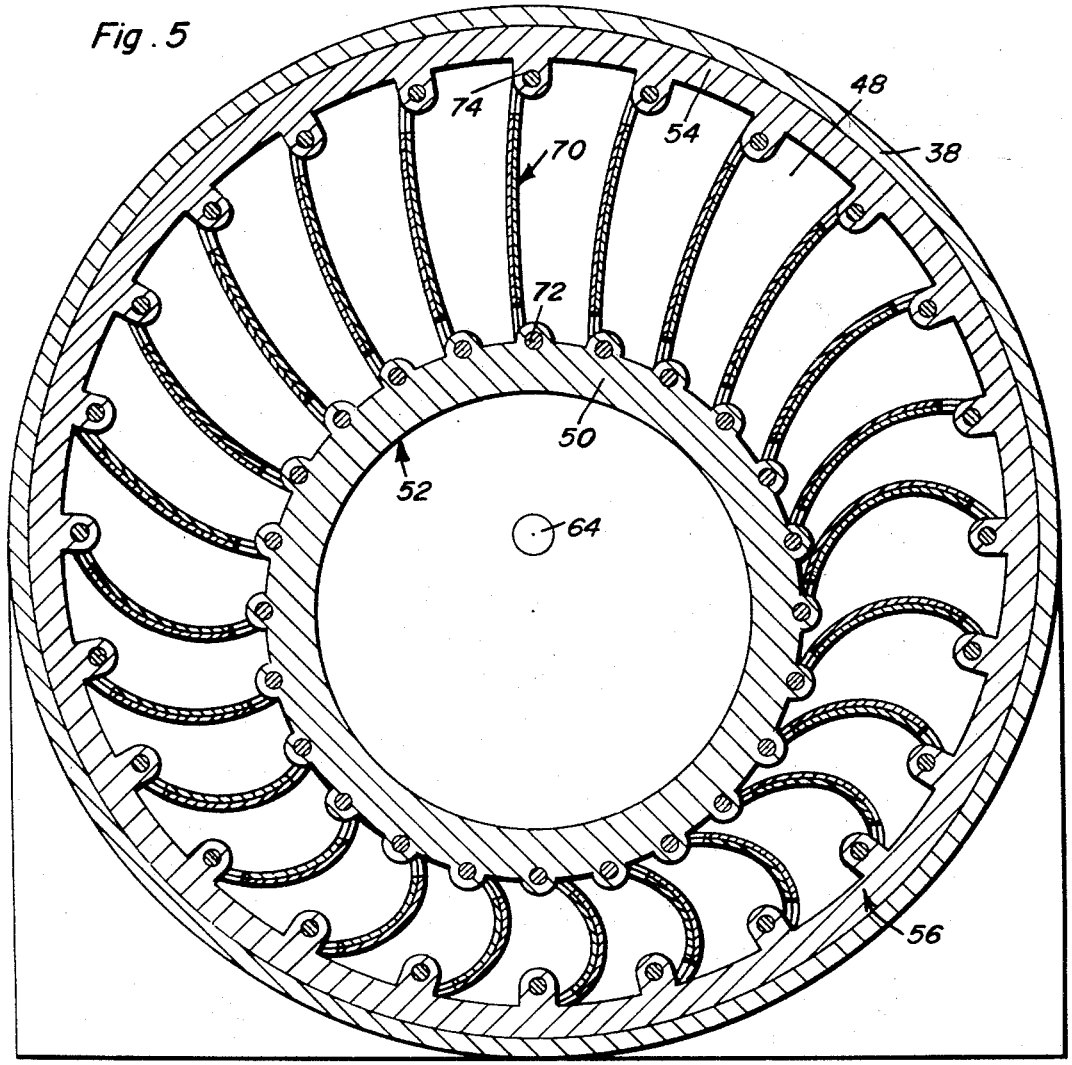
FIGURE 5 is a sectional view taken substantially through a plane indicated by section line 5—5 in FIGURE 4.

Disposed within the annular chamber 48 for passage through the heating and cooling zones established therein as aforementioned, are a plurality of circumferentially spaced bimetallic elements 70. While a minimum amount of such elements are illustrated in FIGURE 5, it should be appreciated that the more elements that are provided, the greater amount of energy conversion will occur. Each bimetallic element 70 is of a well-known construction wherein two different metals are secured to each other so that expansion or contraction of one of the metals at a greater rate than the other will cause the element to bend or straighten out bringing the end portions thereof either closer to each other or further apart. The end portions of each bimetallic elements 70 are pivotally interconnected by the pins 72 and 74 to radially spaced locations on the flange portions 50 and 54 of the rotors thereby form a constant drive arrangement.

The construction and operation of engine 10 will be apparent from the foregoing description. It will be appreciated therefore, that the bimetallic elements 70 will undergo cyclic expansion and contraction so that the end portions vary the radial spacing between the rotors to which they are pivotally interconnected causing relative rotation between the rotors. The rotation of the rotors will cause the bimetallic elements to pass through the heating and cooling zones established within the chamber 48 to thereby maintain a continuing process wherein the expansion and contraction of the elements 70 is converted into continuous rotation of the rotors under a continuous torque. Thus a driven member or load may be connected to one or both of the rotor shafts. The bimetallic elements 70 have a sliding fit between the side walls of the housing as shown in FIGURES 3 and 4 to substantially seal one zone from the other so that the fluid heating medium may pass at a relatively low temperature and high velocity through the cooling zone with substantially no mixing with the fluid passing at a high temperature through the heating zone.

What is claimed as new is as follows:

1. In combination with a source of heat energy and means for continuously supplying said heat energy, an engine connected to said heat supplying means comprising: solid means thermally expansible and contractible in response to supply and removal of heat energy, at least one driven member and, means for converting said expansion and contraction of the solid means into continuous unidirectional movement of the driven member, said converting means including two rotors, said driven member being connected to one of the rotors, means for rotatably mounting said rotors about spaced eccentric axes, and means for pivotally interconnecting the solid means between the rotors at locations on the rotors radially spaced from each other by variable amounts.

2. The combination of claim 1 wherein said solid means comprises a plurality of bimetallic elements.

3. The combination of claim 2 including a housing forming at least two heat exchange zones between said rotors through which said solid means pass in response to said movement of the driven member, heat energy being supplied to one of said heat exchange zones by the heat supplying means.

4. The combination of claim 1 including a housing forming at least two heat exchange zones between said rotors through which said solid means pass in response to said movement of the driven member, heat energy being supplied to one of said heat exchange zones by the heat supplying means.

5. In a power plant, a housing, a pair of rotors rotatably mounted within the housing in eccentric relation to each other, said rotors having radially outer portions spaced apart by a variable amount to form an annular chamber within the housing, a plurality of thermally expansible elements pivotally interconnected between the radially outer portions of the rotors, and means for establishing heating and cooling zones within said chamber through which the thermally expansible elements pass to undergo cyclic expansion and contraction producing relative rotation of the rotors.

6. A power plant comprising: a housing, a pair of annular members each mounted on a parallel shaft within the housing, one of said annular members being a driven member, said annular members having their outer portions spaced apart to form an annular chamber within the housing, a plurality of thermally expansible and contractible elements pivotally interconnected between the outer portions of the annular members, and means for establishing heating and cooling zones within said chamber through which the thermally expansible and contractible elements pass to undergo expansion and contraction thereby producing continuous relative movement of the driven member.

References Cited

UNITED STATES PATENTS

| | | | |
|---|---|---|---|
| 534,871 | 2/1895 | French | 60—23 |
| 2,931,189 | 4/1960 | Sigworth. | |
| 3,303,642 | 2/1967 | Lee | 60—23 |
| 3,316,415 | 4/1967 | Taylor | 60—23 X |
| 1,258,368 | 3/1918 | Smith | 60—23 |
| 3,070,953 | 1/1963 | Carrel | 60—23 |

CARROLL B. DORITY, JR., *Primary Examiner.*